US012770993B2

(12) United States Patent
Chi et al.

(10) Patent No.: US 12,770,993 B2
(45) Date of Patent: Oct. 20, 2026

(54) METHOD FOR PRODUCING BATTERY MODULE

(71) Applicant: LG ENERGY SOLUTION, LTD., Seoul (KR)

(72) Inventors: Ho-June Chi, Daejeon (KR); Jung-Hoon Lee, Daejeon (KR); Jeong-O Mun, Daejeon (KR); Jin-Yong Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/430,124

(22) Filed: Feb. 1, 2024

(65) Prior Publication Data

US 2024/0178530 A1 May 30, 2024

Related U.S. Application Data

(62) Division of application No. 17/740,603, filed on May 10, 2022, now Pat. No. 11,923,564, which is a (Continued)

(30) Foreign Application Priority Data

May 25, 2017 (KR) ........................ 10-2017-0064794

(51) Int. Cl.
*H01M 10/00* (2006.01)
*H01M 50/204* (2021.01)
(Continued)

(52) U.S. Cl.
CPC ....... *H01M 50/548* (2021.01); *H01M 50/204* (2021.01); *H01M 50/505* (2021.01);
(Continued)

(58) Field of Classification Search
CPC ............. H01M 50/548; H01M 50/204; H01M 50/505; H01M 50/51; H01M 50/512;
(Continued)

(56) References Cited

U.S. PATENT DOCUMENTS 5,001,024 A 3/1991 Eberle
9,136,521 B2 9/2015 Lee et al.
(Continued)

FOREIGN PATENT DOCUMENTS

CN 202275881 U 6/2012
CN 105024224 A 11/2015
(Continued)

OTHER PUBLICATIONS

Machine translation of JP 2011-249243 A, obtained Mar. 2025 (Year: 2011).*

(Continued)

*Primary Examiner* — Nicholas P D'Aniello
(74) *Attorney, Agent, or Firm* — Birch, Stewart, Kolasch & Birch, LLP

(57) ABSTRACT

A method for producing a battery module is provided. The method for producing a battery module includes: stacking a plurality of battery cells; disposing a plurality of bus bars adjacent to electrode leads respectively provided at the plurality of battery cells; by a welding jig, pressing the electrode leads so that the electrode leads come into contact with the bus bars, respectively; and welding the electrode leads and the bus bars through an opening formed in the welding jig.

11 Claims, 6 Drawing Sheets

Related U.S. Application Data division of application No. 16/346,021, filed as application No. PCT/KR2018/000360 on Jan. 8, 2018, now Pat. No. 11,362,402.

(51) Int. Cl.

| | |
|---|---|
| ***H01M 50/505*** | (2021.01) |
| ***H01M 50/51*** | (2021.01) |
| ***H01M 50/512*** | (2021.01) |
| ***H01M 50/516*** | (2021.01) |
| ***H01M 50/548*** | (2021.01) |
| ***H01M 50/55*** | (2021.01) |

(52) U.S. Cl.
CPC ......... *H01M 50/51* (2021.01); *H01M 50/512* (2021.01); *H01M 50/516* (2021.01); *H01M 50/55* (2021.01); *H01M 2220/20* (2013.01)

(58) Field of Classification Search
CPC ............... H01M 50/516; H01M 50/55; H01M 2220/20; H01M 50/531; Y02E 60/10; Y02P 70/50
See application file for complete search history.

(56) References Cited

U.S. PATENT DOCUMENTS

| | | | | |
|---|---|---|---|---|
| 10,862,095 | B2 * | 12/2020 | Park .................... | H01M 50/548 |
| 2012/0058383 | A1 | 3/2012 | Hashizaki | |
| 2012/0094161 | A1 | 4/2012 | Zheng | |
| 2012/0295150 | A1 | 11/2012 | Gao et al. | |
| 2013/0280578 | A1 | 10/2013 | Yang et al. | |
| 2015/0132622 | A1 | 5/2015 | Gohl et al. | |
| 2015/0171399 | A1 | 6/2015 | Jeong | |
| 2016/0233476 | A1 | 8/2016 | Okamoto et al. | |
| 2016/0315359 | A1 * | 10/2016 | Tyler ................... | H01M 50/507 |
| 2017/0125774 | A1 | 5/2017 | Choi et al. | |
| 2019/0280277 | A1 * | 9/2019 | Kato ................... | H01M 50/548 |

FOREIGN PATENT DOCUMENTS

| | | | |
|---|---|---|---|
| CN | 106207067 | A | 12/2016 |
| JP | 2001-76790 | A | 3/2001 |
| JP | 2006-127964 | A | 5/2006 |
| JP | 2007-87907 | A | 4/2007 |
| JP | 2007-109548 | A | 4/2007 |
| JP | 4227762 | B2 | 2/2009 |
| JP | 2011-249243 | A | 12/2011 |
| JP | 2012-109275 | A | 6/2012 |
| JP | 2013-214497 | A | 10/2013 |
| JP | 5438154 | B2 | 3/2014 |
| JP | 5582815 | B2 | 9/2014 |
| KR | 10-1023184 | B1 | 3/2011 |
| KR | 10-2013-0113145 | A | 10/2013 |
| KR | 10-2014-0093424 | A | 7/2014 |
| KR | 10-2015-0113758 | A | 10/2015 |
| KR | 10-2015-0113827 | A | 10/2015 |
| KR | 10-2015-0125387 | A | 11/2015 |
| KR | 10-2017-0032098 | A | 3/2017 |

OTHER PUBLICATIONS

International Search Report issued in PCT/KR2018/000360 (PCT/ISA/210), dated Jun. 26, 2018.

* cited by examiner

METHOD FOR PRODUCING BATTERY MODULE

CROSS-REFERENCE TO RELATED APPLICATION

The present application is a divisional of U.S. application Ser. No. 17/740,603, filed on May 10, 2022, which is a divisional of U.S. application Ser. No. 16/346,021, filed on Apr. 29, 2019 (now U.S. Pat. No. 11,362,402, issued on Jun. 14, 2022), which is a national phase entry under 35 U.S.C. § 371 of International Patent Application No. PCT/KR2018/000360, filed on Jan. 8, 2018, which claims priority from Korean Patent Application No. 10-2017-0064794, filed on May 25, 2017, the disclosures of which are hereby incorporated herein by reference in their entireties.

TECHNICAL FIELD

The present disclosure relates to a method for producing the battery module, and more particularly, to a method for producing the battery module capable of coupling electrode leads to a bus bar without bending the electrode leads.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and an outer member, that is a battery case, which seals and receives the electrode assembly together with an electrolyte solution.

The lithium secondary battery includes a positive electrode, a negative electrode, and a separator interposed therebetween and an electrolyte. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery is prepared by applying the positive or negative electrode active material to a current collector made of aluminum or copper sheet, mesh, film, foil, or the like and then drying the same.

FIG. 1 is a diagram showing that an electrode lead and a bus bar provided in a conventional battery cell are electrically coupled to each other. Referring to FIG. 1, in the conventional art, electrode leads 20 respectively provided to a plurality of battery cells 10 are bent to contact a surface of a bus bar 30, and then bonded thereto by welding 40. In this case, a lot of manual works are demanded to a worker in order to maintain a bending shape of the electrode leads 20, and the electrode leads 20 and the bus bar 30 are not closely adhered to each other due to an elastic recovery force of the electrode leads 20 made of a metal. In addition, since the plurality of electrode leads 20 are overlapped at one point of the bus bar 30 and then welded 40, the weldability is deteriorated.

DISCLOSURE

Technical Problem

The present disclosure is directed to providing a method for producing the battery module capable of closely adhering electrode leads and a bus bar to each other by coupling the electrode leads to the bus bar without bending the electrode leads.

The present disclosure is also directed to providing a method for producing the battery module capable of having improved weldability since the electrode leads are not overlapped.

The present disclosure is also directed to providing a method for producing the battery module capable of improving an automation ratio of the production line by eliminating a manual process for bending the electrode leads.

Technical Solution

In one aspect of the present disclosure, there is provided a method for producing a battery module, comprising: stacking a plurality of battery cells; disposing a plurality of bus bars adjacent to electrode leads respectively provided at the plurality of battery cells; by a welding jig, pressing the electrode leads so that the electrode leads come into contact with the bus bars, respectively; and welding the electrode leads and the bus bars through an opening formed in the welding jig.

Also, the bus bar may have an inclined portion, and the electrode lead may be welded at the inclined portion of the bus bar to be coupled to the bus bar.

In addition, the bus bar may have an inclined portion and a horizontal portion horizontally extending from the inclined portion, and the electrode lead may be welded at the horizontal portion of the bus bar to be coupled to the bus bar.

Advantageous Effects

According to the embodiments of the present disclosure, since the electrode leads may be coupled to each bus bar without being bent, the electrode leads are not restored by an elastic recovery force, thereby allowing the electrode leads and the bus bar to be closely adhered.

Also, since the plurality of electrode leads are respectively coupled to the plurality of bus bars, the electrode leads are not overlapped, thereby improving the weldability.

In addition, since a manual process for bending the electrode leads is eliminated, an automation ratio of the production line may be improved.

BEST MODE

Figure 1:
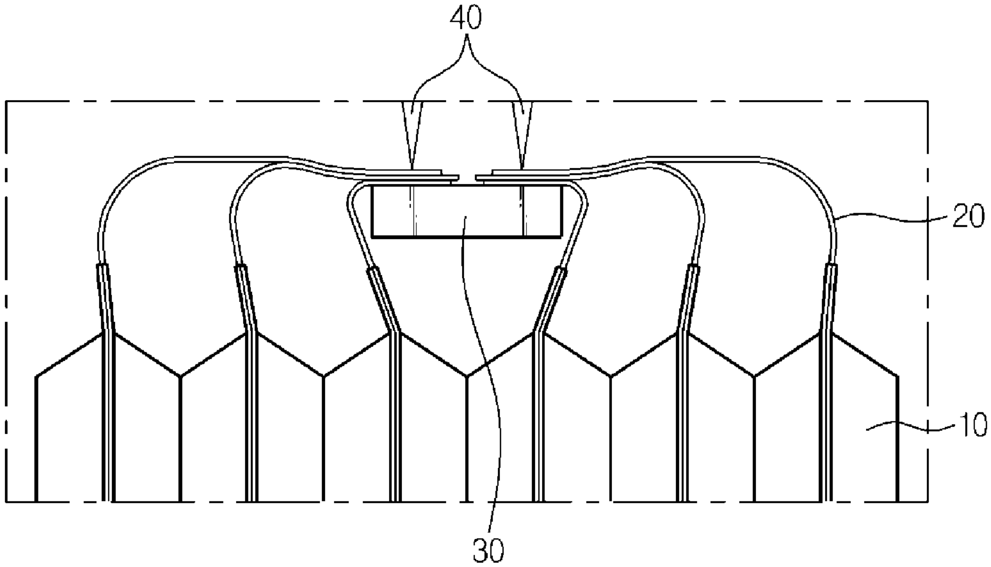
FIG. 1 is a diagram showing that an electrode lead and a bus bar provided in a conventional battery cell are electrically coupled to each other.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

Figure 2:
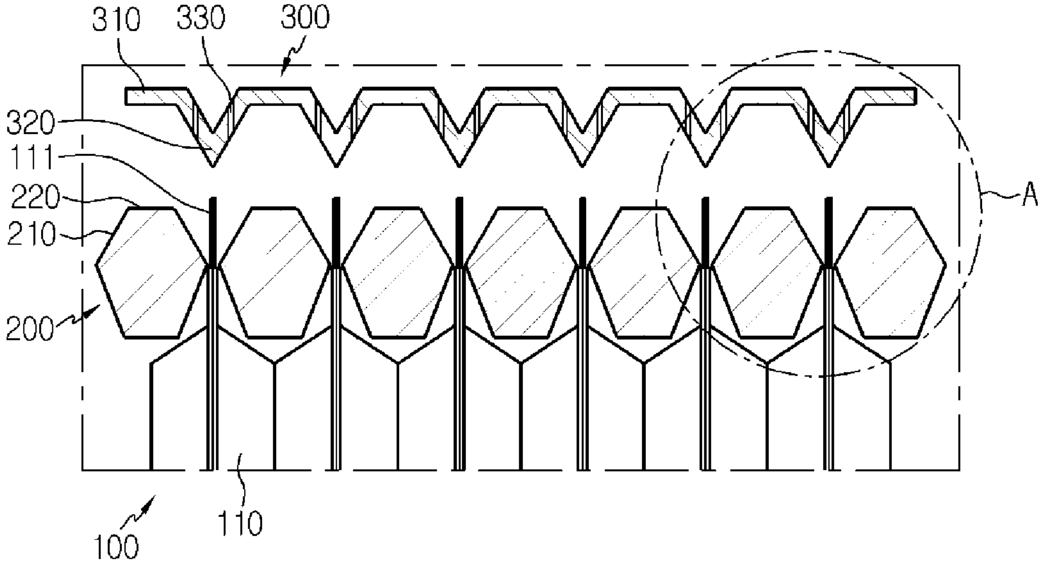
Prior Art FIG. 2
FIG. 2 is a schematic side sectioned view showing a state before an electrode lead is coupled to a bus bar in a battery module according to the first embodiment of the present disclosure.
Figure 3:
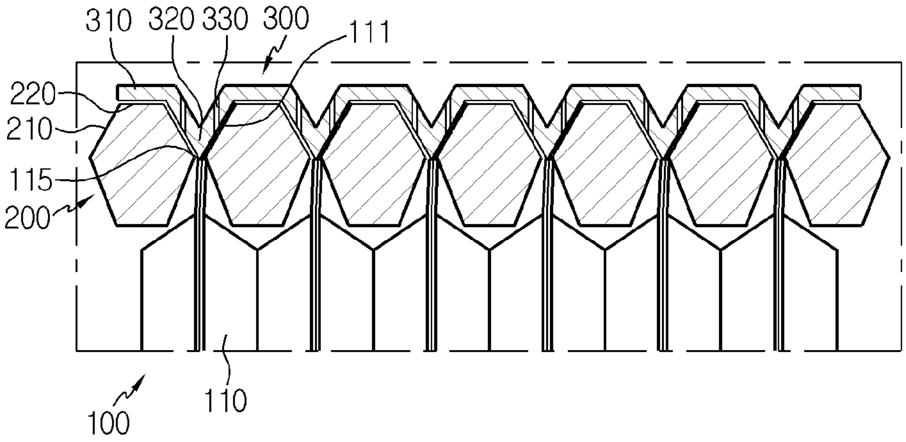
FIG. 3 is a schematic side sectioned view showing a state after the electrode lead is coupled to the bus bar in the battery module according to the first embodiment of the present disclosure.

FIG. 2 is a schematic side sectioned view showing a state before an electrode lead is coupled to a bus bar in a battery module according to the first embodiment of the present disclosure, and FIG. 3 is a schematic side sectioned view showing a state after the electrode lead is coupled to the bus bar in the battery module according to the first embodiment of the present disclosure.

Referring to FIGS. 2 and 3, a battery module according to an embodiment of the present disclosure includes a battery cell stack 100 and a plurality of bus bars 200.

The battery cell stack 100 may be configured so that a plurality of battery cells 110 are stacked therein. The battery cells 110 may have various structures, and the plurality of unit cells 110 may be stacked in various ways. The battery cell 110 may be configured so that a plurality of unit cells, in each of which a positive electrode plate, a separator and a negative electrode plate are arranged in order, or a plurality of bi-cells, in each of which a positive electrode plate, a separator, a negative electrode plate, a separator, a positive electrode plate, a separator and a negative electrode plate are arranged in order, are stacked suitable for a battery capacity.

The battery cell 110 may have an electrode lead 111. The electrode lead 111 is a type of terminal that is exposed to the outside and connected to an external device, and the electrode lead 111 may be made of a conductive material. The electrode lead 111 may include a positive electrode lead and a negative electrode lead. The positive electrode lead and the negative electrode lead may be disposed in opposite directions with respect to the longitudinal direction of the battery cell 110, or the positive electrode lead and the negative electrode lead may be positioned in the same direction with respect to the longitudinal direction of the battery cell 110. The electrode lead 111 is electrically coupled to the bus bar 200, explained later.

The battery cell stack 100 may include a plurality of cartridges (not shown) for accommodating the battery cells 110. Each cartridge (not shown) may be fabricated by injection-molding plastic, and a plurality of cartridges (not shown) having an accommodation portion for accommodating the battery cell 110 may be stacked. A cartridge assembly in which a plurality of cartridges (not shown) are stacked may include a connector element or a terminal element. The connector element may include various types of electrical connecting components or connecting components for connecting to, for example, a battery management system (BMS) (not shown) capable of providing data on voltage or temperature of the battery cells 110. In addition, the terminal element includes a positive electrode terminal and a negative electrode terminal as main terminals connected to the battery cell 110, and the terminal element may have a terminal bolt to be electrically connected to the outside. Meanwhile, the battery cell 110 may have various shapes.

The bus bars 200 are coupled to the electrode leads 111 to electrically connect the electrode leads 111. Here, the electric connection may include serial or parallel connection. The bus bars 200 are disposed adjacent to the electrode leads 111 to contact the electrode leads 111 provided at the battery cells 110. Referring to FIG. 2, the bus bars 200 may be disposed between the electrode leads 111. Here, at least one of the plurality of bus bars 200 may be disposed between neighboring electrode leads 111, and the bus bar 200 disposed at an outermost side may be provided adjacent to a predetermined electrode lead 111. In addition, referring to FIG. 3, the electrode leads 111 respectively provided at the plurality of battery cells 110 come into contact with and are electrically coupled to the plurality of bus bars 200, respectively.

The bus bar 200 may have various shapes, and, for example, as shown in FIGS. 2 and 3, an inclined portion 210 may be formed at the bus bar 200. In addition, the electrode lead 111 may have a first bent portion 115 (see FIG. 3) bent at a slope corresponding to the inclination of the inclined portion 210. That is, the electrode lead 111 may be bent at the first bent portion 115 of the electrode lead 111, and then the electrode lead 111 may come into contact with the inclined portion 210 of the bus bar 200. In addition, the electrode lead 111 may be welded 500 at the inclined portion 210 of the bus bar 200 to be coupled to the bus bar 200. For this, a welding jig 300 with an inclination corresponding to the inclined portion 210 of the bus bar 200 may press the electrode lead 111 at an upper side of the electrode lead 111 to form the first bent portion 115 at the electrode lead 111.

That is, if the welding jig 300 presses the electrode leads 111, for example, downward at an upper side of the electrode leads 111 after the plurality of bus bars 200 are respectively disposed between the electrode leads 111 or adjacent to the electrode leads 111, the electrode lead 111 are bent toward the inclined portion 210 of the bus bar 200 to contact the inclined portion 210 of the bus bar 200. Here, an opening 330 may be formed in the welding jig 300, and the welding 500, for example, laser welding, may be performed through the opening 330 of the welding jig 300 to electrically connect the electrode leads 111 to the inclined portions 210 of the plurality of bus bars 200, respectively. The welding jig 300 may include a bus bar contacting portion 310 contacting an upper side of the bus bar 200 and a pressing bending portion 320 extending from the bus bar contacting portion 310 to press and bend the electrode lead 111. In addition, at the welding jig 300, the opening 330 for the welding 500 may be provided in the pressing bending portion 320.

Hereinafter, the operation and effect of the battery module according to the first embodiment of the present disclosure will be described with reference to the drawings.

Figure 4:
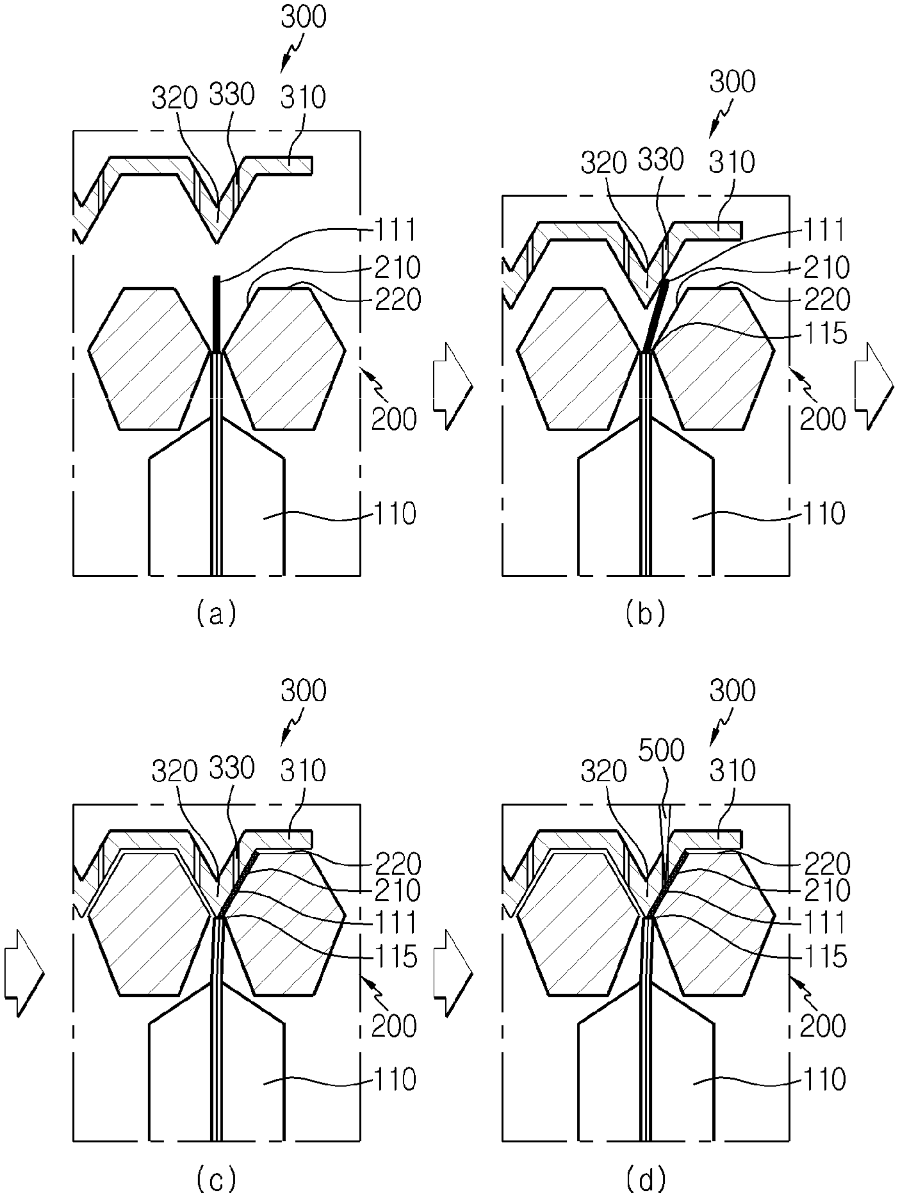
FIGS. 4(*a*) to 4(*d*) are diagrams for illustrating a process that the electrode lead is coupled to the bus bar in the battery module according to the first embodiment of the present disclosure.

FIGS. 4(*a*) to 4(*d*) are diagrams for illustrating a process that the electrode lead is coupled to the bus bar in the battery module according to the first embodiment of the present disclosure. In FIGS. 4(*a*) to 4(*d*), only a portion of FIG. 2, namely a portion A of FIG. 2, is depicted.

Referring to FIG. 4(*a*), the bus bar 200 is disposed adjacent to the electrode lead 111. Referring to FIG. 4(*b*), the welding jig 300 moves from an upper side to a lower side to press the electrode lead 111. Referring to FIG. 4(*c*), the electrode lead 111 is bent to contact the inclined portion 210 of the bus bar 200. Referring to FIG. 4(*d*), the electrode lead 111 is electrically coupled to the inclined portion 210 of the bus bar 200 through the opening 330 of the welding jig 300 by means of the welding 500, for example laser welding.

As a result, the electrode leads 111 and the bus bars 200 may be closely adhered to each other and the electrode leads 111 may be respectively coupled to the bus bar 200 without bending the electrode leads 111, thereby preventing the electrode leads 111 from overlapping and thus improving the welding property.

Figure 5:
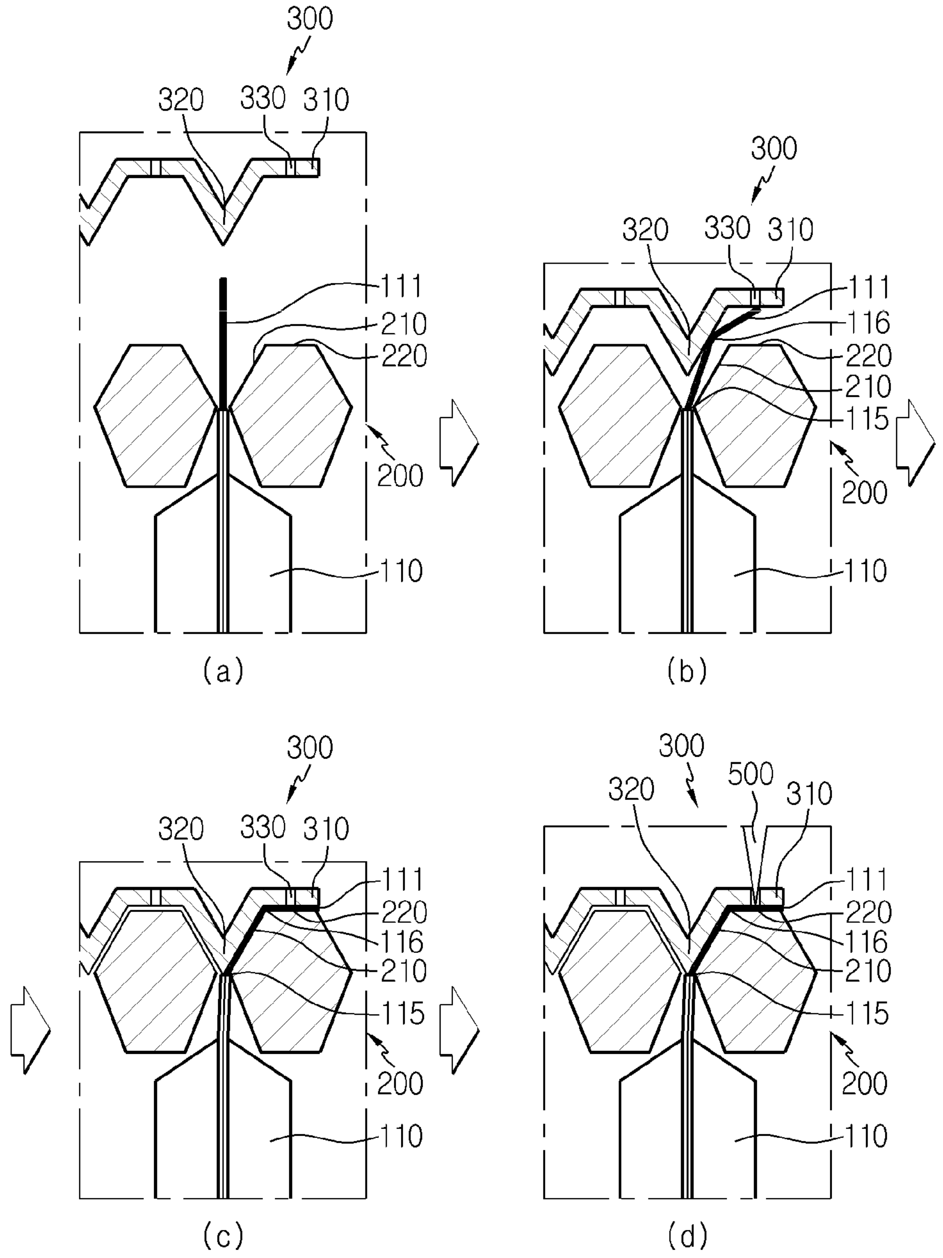
FIGS. 5(*a*) to 5(*d*) are diagrams for illustrating a process that an electrode lead is coupled to a bus bar in a battery module according to the second embodiment of the present disclosure.

FIGS. 5(*a*) to 5(*d*) are diagrams for illustrating a process that an electrode lead is coupled to a bus bar in a battery module according to the second embodiment of the present disclosure.

Hereinafter, the function and effect of a battery module according to the second embodiment according to the present disclosure will be described with reference to the drawings, but features common to the battery module according to the first embodiment of the present disclosure will not be described again in detail.

The second embodiment of the present disclosure is different from the first embodiment in the point that the electrode lead 111 is not welded at the inclined portion 210 of the bus bar 200 but is welded at a horizontal portion 220 of the bus bar 200.

Referring to FIGS. 5(*a*) to 5(*d*), the bus bar 200 may have a horizontal portion 220 extending horizontally from the inclined portion 210, in addition to the inclined portion 210. In addition, a first bent portion 115 and a second bent portion 116 are formed at the electrode lead 111. The first bent portion 115 may be formed in a way that the electrode lead 111 is bent at a slope corresponding to the inclination of the inclined portion 210 so that the electrode lead 111 comes into contact with the inclined portion 210 of the bus bar 200, similar to the first embodiment. In addition, the second bent portion 116 may be formed in a way that the electrode lead 111 is bent to correspond to the horizontal portion 220 so that the electrode lead 111 may come into contact with the horizontal portion 220 of the bus bar 200.

In addition, the electrode lead 111 may be welded 500 at the horizontal portion 220 of the bus bar 200 to be coupled to the bus bar 200, and the opening 330 for the welding 500 at the welding jig 300 may be provided in the bus bar contacting portion 310.

Referring to FIG. 5(*a*), the bus bar 200 is disposed adjacent to the electrode lead 111. Referring to FIG. 5(*b*), the welding jig 300 is moved from an upper side to a lower side to press the electrode lead 111. Referring to FIG. 5(*c*), the electrode lead 111 is bent to come into contact with the inclined portion 210 of the bus bar 200 and the horizontal portion 220 of the bus bar 200. Referring to FIG. 5(*d*), the electrode lead 111 is electrically coupled to the horizontal portion 220 of the bus bar 200 through the opening 330 of the welding jig 300 by means of the welding 500, for example laser welding.

Figure 6:
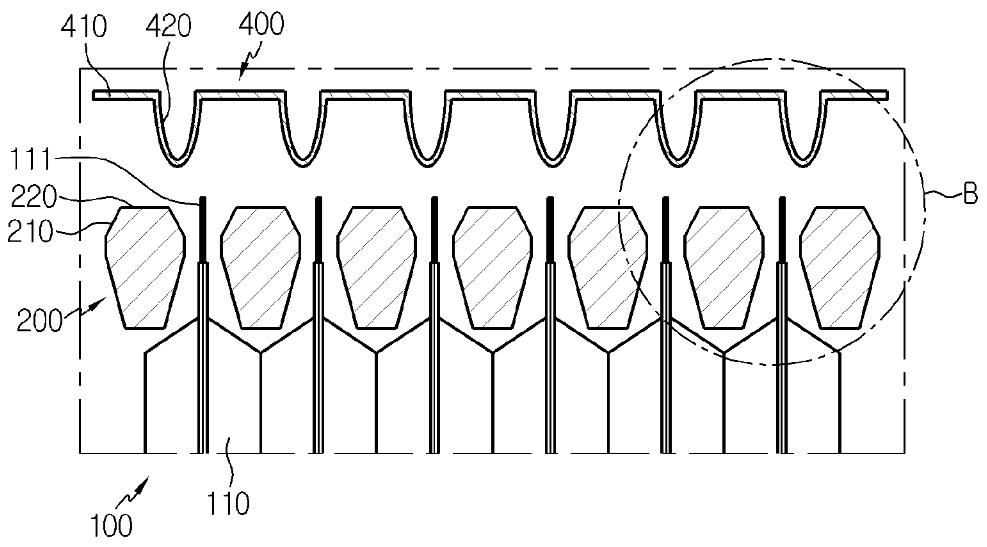
FIG. 6 is a schematic side sectioned view showing a state before an electrode lead is coupled to a bus bar in a battery module according to the third embodiment of the present disclosure.
Figure 7:
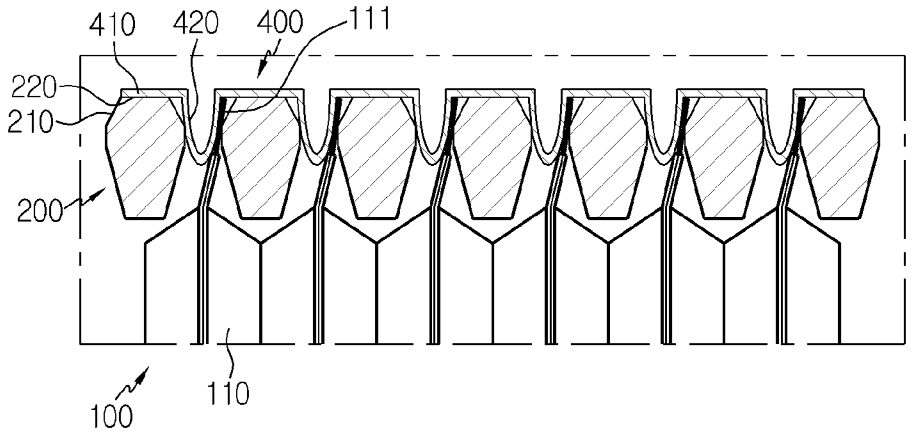
FIG. 7 is a schematic side sectioned view showing a state after the electrode lead is coupled to the bus bar in the battery module according to the third embodiment of the present disclosure.
Figure 8:
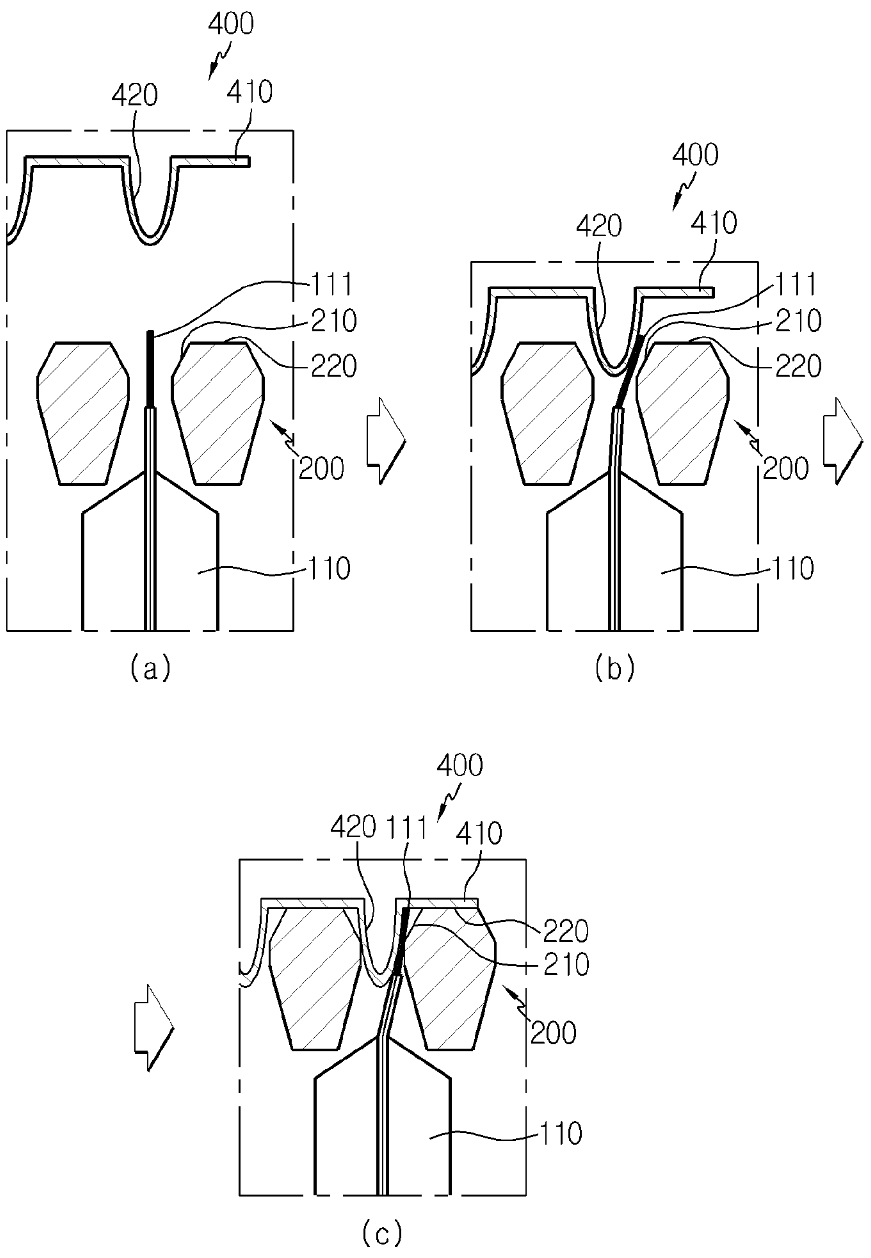
FIGS. 8(*a*) to 8(*c*) are diagrams for illustrating a process that the electrode lead is coupled to the bus bar in the battery module according to the third embodiment of the present disclosure.

FIG. 6 is a schematic side sectioned view showing a state before an electrode lead is coupled to a bus bar in a battery module according to the third embodiment of the present disclosure, FIG. 7 is a schematic side sectioned view showing a state after the electrode lead is coupled to the bus bar in the battery module according to the third embodiment of the present disclosure, and FIGS. 8(*a*) to 8(*c*) are diagrams for illustrating a process that the electrode lead is coupled to the bus bar in the battery module according to the third embodiment of the present disclosure. In FIGS. 8(*a*) to 8(*c*), only a portion of FIG. 6, namely a portion B of FIG. 6, is depicted.

Hereinafter, the function and effect of the battery module according to the third embodiment according to the present disclosure will be described with reference to the drawings, but features common to the battery module according to the first and second embodiments of the present disclosure will not be described again in detail.

The third embodiment of the present disclosure is different from the first and second embodiments in the point that the electrode lead 111 is coupled to the bus bar 200 not by welding but by an elastic member 400.

Referring to FIGS. 6 and 7, the elastic member 400 may be configured to press the electrode leads 111 so that the electrode leads 111 are coupled to the plurality of bus bars 200, respectively. That is, since the electrode leads 111 are pressed by an elastic force of the clastic member 400, the electrode leads 111 may be electrically coupled to the bus bars 200 without welding.

The elastic member 400 may have a variety of configurations, for example, a leaf spring. The elastic member 400 may include a support portion 410 and a pressing portion 420. The support portion 410 is supported in contact with the bus bar 200 at an upper side of the bus bar 200. The support portion 410 may be in contact with, for example, the horizontal portion 220 of the bus bar 200. The pressing portion 420 may be configured to extend from the support portion 410 and press the electrode lead 111 while moving, for example, from an upper side to a lower side of the electrode lead 111. The pressing portion 420 may be provided in plural corresponding to the number of the electrode leads 111. In the first and second embodiments, the welding jig 300 is removed after the electrode lead 111 and the bus bar 200 are coupled. However, in the third embodiment, the elastic member 400 is inserted between the bus bars 200 and maintained so that the electrode leads 111 are in contact with the bus bars 200.

Referring to FIGS. 6 and 7, similar to the first and second embodiments, the bus bar 200 may have an inclined portion 210 formed therein, and the elastic member 400 presses the electrode leads 111 so that the electrode leads 111 are coupled to the inclined portions 210 of the plurality of bus bars 200, respectively. However, the elastic member 400 may also press the electrode leads 111 so that the electrode leads 111 contact both the inclined portion 210 and the horizontal portion 220 of the bus bar 200, without being limited to the above.

Referring to FIG. 8(*a*), the bus bar 200 is disposed adjacent to the electrode lead 111. Referring to FIG. 8(*b*), the elastic member 400 presses the electrode lead 111 while moving from an upper side to a lower side. Referring to FIG. 8(*c*), the electrode lead 111 comes into contact with the inclined portion 210 of the bus bar 200 and is electrically connected thereto by the elastic member 400.

Meanwhile, a battery pack (not shown) according to an embodiment of the present disclosure may include one or more battery modules according to an embodiment of the present disclosure as described above. Also, in addition to the battery modules, the battery pack (not shown) may further includes a case for accommodating the battery modules, and various devices for controlling charge and discharge of the battery modules, such as a BMS, a current sensor, a fuse, and the like.

Meanwhile, a vehicle (not shown) according to an embodiment of the present disclosure may include the battery module or the battery pack (not shown) described above, and the battery pack (not shown) may include the battery module. In addition, the battery module according to an embodiment of the present disclosure may be applied to the vehicle (not shown), for example, a predetermined vehicle (not shown) provided to use electricity like an electric vehicle or a hybrid electric vehicle.

Hereinafter, a method of producing a battery module according to an embodiment of the present disclosure will be described with reference to the drawings.

First, a plurality of battery cells 110 are stacked to form a battery cell stack 100. The number of battery cells 110 is not limited. In addition, a plurality of bus bars 200 are disposed adjacent to electrode leads 111 respectively provided at the plurality of battery cells 110, respectively. Here, the bus bar 200 may be disposed between neighboring electrode leads 111. In addition, the welding jig 300 presses the electrode leads 111 while moving, for example, from an upper side to a lower side of the electrode leads 111 so that the electrode leads 111 come into contact with the respective bus bars 200. Here, the pressing bending portion 320 of the welding jig 300 may press the electrode lead 111. In addition, the electrode leads 111 and the bus bars 200 are welded 500, for example laser-welded, through the opening 330 formed in the welding jig 300, thereby electrically coupling the electrode leads 111 and the bus bars 200.

In addition, an inclined portion 210 may be formed at the bus bar 200, and the electrode lead 111 may be welded 500 at an inclined portion 210 of the bus bar 200 to be coupled to the bus bar 200 after being bent by the welding jig 300. Alternatively, the bus bar 200 may have an inclined portion 210 and a horizontal portion 220 extending horizontally from the inclined portion 210, and the electrode lead 111 may be bent by the welding jig 300 and then welded 500 at the horizontal portion 220 of the bus bar 200 to be coupled to the bus bar 200.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure is directed to a battery module, a battery pack including the battery module, and a method for producing the battery module, and is particularly applicable to industries associated with a secondary battery.

What is claimed is:

1. A battery module, comprising:

a battery cell stack having a plurality of stacked battery cells, each battery cell having an electrode lead; and a plurality of bus bars respectively disposed adjacent to the electrode leads provided at the plurality of battery cells, each bus bar having a flat portion and an inclined portion extending from the flat portion at an angle greater than 90 degrees and less than 180 degrees, each flat portion extending parallel to a stacking direction of the plurality of stacked battery cells, wherein the electrode leads are electrically connected to the plurality of bus bars, wherein the electrode leads overlap and contact the flat portions of the bus bars, wherein each electrode lead extends vertically between two adjacent busbars, each electrode lead having a first bend, a second bend, a straight inclined portion between the first bend and the second bend that extends a slope corresponding to the inclination of the inclined portion such that the electrode leads are bent in a same direction, and a horizontal part overlapping the flat portion of the bus bar in the same direction, and wherein each electrode lead is only welded at the flat portion of the bus bar located below the electrode lead to be coupled to the bus bar such that the welded portion of the electrode lead is exposed above the bus bar.

2. The battery module according to claim 1, wherein the horizontal part of each electrode lead comes into contact with the flat portion of the bus bar.

3. The battery module according to claim 1, wherein the cross-section of each bus bar is a hexagonal shape.

4. The battery module according to claim 1, wherein the number of stacked battery cells is three or more.

5. The battery module according to claim 1, wherein each bus bar is connected to only one electrode lead of the electrode leads.

6. A battery pack, comprising a battery module defined in claim 1.

7. A vehicle, comprising a battery module defined in claim 1.

8. A method for producing a battery module defined in claim 1, the method comprising:

stacking the plurality of battery cells;

disposing the plurality of bus bars adjacent to the electrode leads respectively provided at the plurality of battery cells;

pressing the electrode leads with a welding jig so that the electrode leads come into contact with the bus bars, respectively; and welding the electrode leads and the bus bars through an opening formed in the welding jig.

9. The method for producing a battery module according to claim 8, wherein the welding jig simultaneously presses all of the electrode leads to the plurality of bus bars.

10. The method for producing a battery module according to claim 8, wherein the number of stacked battery cells is three or more.

11. The method for producing a battery module according to claim 8, wherein each bus bar is connected to only one electrode lead of the electrode leads.

* * * * *